No. 616,992. Patented Jan. 3, 1899.
D. TAYLOR.
DOOR OR LIKE HOOK.
(Application filed Feb. 16, 1898.)
(No Model.)
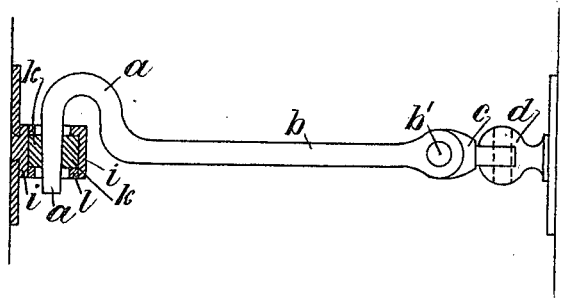

UNITED STATES PATENT OFFICE.

DANIEL TAYLOR, OF LIVERPOOL, ENGLAND.

DOOR OR LIKE HOOK.

SPECIFICATION forming part of Letters Patent No. 616,992, dated January 3, 1899.

Application filed February 16, 1898. Serial No. 670,486. (No model.)

*To all whom it may concern:*

Be it known that I, DANIEL TAYLOR, a subject of the Queen of England, and a resident of Liverpool, England, have invented certain new and useful Improvements in Door or Like Hooks, of which the following is a specification.

This invention has reference to door-hanks used for holding doors in the open or other desired position and the hanks being of the kind which are loosely hinged or carried at the end and have at their other end a hook which passes through an eye on the door, or vice versa. The invention, however, is also applicable to hanks used for similar purposes, as window-hanks.

In the accompanying drawing the figure is an elevation, partly in section, showing the invention.

In the drawing the construction there shown illustrates the invention as applied to a door or the like of what would be called a "small" or "medium" sized hank and of a type commonly used on board ship for holding doors in their open position. The hank proper consists of a hook portion $a$, with a shank $b$ hinged at $b'$ to a joint-piece $c$, which in turn is hinged to the fastening jaw or eye $d$, screwed or equivalently fastened by a flange in the ordinary way to the door or the stationary part. The two joints give this hook a movement both in the horizontal and the vertical planes. The hank-eye, with which the hook engages, is designated $i$ and in the case shown is cored or bored out where the hook passes through into a chamber which is lined with a ring of india-rubber $k$ or other suitable material, and a ring $l$, removably inserted into the bottom end of eye $i$, keeps the ring in place. The chief object, however, of this ring $l$ is to enable the chamber in which the ring $k$ sits to be bored or cleaned out after casting. It will be seen by the drawing that the hole in the upper part of the eye and the hole in the ring $l$ are larger than the bore of the rubber ring and the diameter of the hook $a$, so that a clear inwardly-projecting portion of rubber within the metal exists all around and prevents the hook coming up against the metal of the eye. The hole through the rubber lining $k$ should be slightly less than or equal to the part of the hook $a$ which would normally rest within it, so that it practically touches all around and no movement between the hook or eye can take place, while at the same time one of these two parts being of comparatively soft material the hook can readily be placed in and taken out of the eye and is not liable to stick.

What is claimed in respect of the herein-described invention is—

1. The combination of the hinged hook $a$, with a hollow eye $i$, bearings extending inward at the upper and lower portions of said eye, and a rubber lining $k$, fitting in the interior of the eye with the interior surface projecting inward beyond the edge of the bearings; substantially as and for the purposes set forth.

2. The combination with a hinged hook $a$, of an eye having a cylindrical opening with an inwardly-extending flange at one end, a rubber ring seated in said opening and abutting against the flange, and a ring $l$ for holding said packing in place, the packing extending inward beyond the flange and ring, substantially as described.

In witness whereof I have hereunto set my hand in presence of two witnesses.

DANIEL TAYLOR.

Witnesses:
E. ERNEST COLLIER,
JAS. SPENCER LEE.